United States Patent Office 3,264,182
Patented August 2, 1966

3,264,182
PRESERVATION OF ANIMAL SPECIMENS
Ralph R. Langner, Lake Jackson, Tex., assignor to The Dow Chemical Company, Midland, Mich., a corporation of Delaware
No Drawing. Filed Sept. 23, 1963, Ser. No. 310,872
16 Claims. (Cl. 167—49.5)

This application is a continuation-in-part of copending application Serial No. 278,417, filed May 6, 1963, now abandoned.

This invention relates to a process and composition for the preservation of specimens of the animal kingdom. More particularly, the present invention relates to the preservation of lifeless specimens of the animal kingdom by treatment with heterocyclic compounds characterized by the presence of a 1,4-dioxanone ring structure in the molecule and/or the hydrolysis products of such 1,4-dioxanone compounds.

Many compounds which are useful to preserve animal specimens are known. Phenol and formaldehyde are common preservatives useful for embalming. Such compounds are adequate preservatives, but most of the compounds of this type have objectionable odors, are very toxic and tend to leave the treated specimens in a rigid state.

It has now been found that the treatment of lifeless animal specimens with 2-para-dioxanone and alkyl-substituted derivatives of 2-para-dioxanone, as well as the hydrolysis products of such compounds, leaves the preserved specimens in a flexible and life-like condition. Moreover, the 2-para-dioxanones and their hydrolysis products are less toxic and do not have offensive odors.

The term "preservation" as used herein means that the enzymatic action within the animal tissue is stopped, thus preventing the autocatalytic destruction of the tissue, and that the treated tissues resist external attack from bacteria and fungi. By "specimen of the animal kingdom" is meant and portion (or the entire body) of an animal organism. Examples of such organisms include the mammals, insects, fish and non-vertebrates as well as sections of such animals. Other examples include specimens of human tissue and cadavers.

The compounds which are useful as the active preservative ingredient in the treating compositions of the invention are δ-lactones with an additional hetero-oxygen atom in the ring and the hydrolysis products of such δ-lactones. A suitable subclass of these compounds (in non-hydrolyzed form) may be represented by the following formula (I)
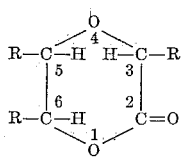

wherein each R may be the same or different and each is selected from the group consisting of a hydrogen atom, a methyl group and an ethyl group. Examples of such compounds include 2 - p - dioxanone(1,4-dioxan-2-one), 3,5-dimethyl - 1,4 - dioxan - 2 - one, 3-methyl-6-ethyl-1,4-dioxan-2-one, 3,5,6-trimethyl-1,4-dioxan-2-one and 6-methyl-1,4-dioxan-2-one. These compounds may also be employed as preservatives in their acid form or as equilibrium mixtures with their hydrolysis products.

The specimens of animal tissue may be treated with the active preservative compounds (either in the form of the δ-lactones, the acid form of such δ-lactones or as equilibrium mixtures of such δ-lactones) by several methods such as immersion, injection or infusion. The 2-p-dioxanones may be employed in aqueous solutions in concentrations of from 1 percent to 100 percent (pure compound) by weight, or the compounds may be admixed with other known preservatives (such as formaldehyde). Various solvents for the δ-lactone compounds may be used. When 2-p-dioxanone is used as the active embalming agent, solvents such as water, benzene, toluene, xylene, dioxane, diethyl ether, chloroform, tetrahydrofuran, aliphatic alcohols (such as ethanol and i-propanol), ketones (such as acetone), polyols (such as ethylene glycol) and aldehydes may be used. Any relatively inert substance which dissolves the δ-lactone embalming agents is suitable for use as a carrier in impregnating the specimens of animal tissue. When water is used as the solvent, the δ-lactone forms an equilibrium mixture with its hydrolysis products (predominantly 2-hydroxyalkoxyalkanoic acid). For specimens which do not require deep penetration, suspensions of embalming agent may be used. In the case of 2-p-dioxanone and those methyl-substituted 2-p-dioxanones which are liquids at about 27° C., the compounds may be used without a solvent.

When water is used as a solvent, an equilibrium mixture is formed which contains predominantly 2-hydroxyalkoxyalkanoic acid along with some polymer

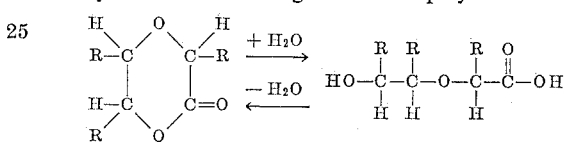

wherein each R is an defined in Equation I. When very dilute aqueous solutions are employed (less than about 10 percent by weight of dioxanone compound), the lactone is largely in the acid form. For convenience, concentrations are based upon the total amount of δ-lacetone present in the solution, including the δ-lactone present in hydrolyzed form. Thus, active aqueous preservative solutions may be prepared from either the dioxanone compound or from the corresponding 2-hydroxyalkoxy-alkanoic acid, since in either case an equilibrium mixture is obtained in water solution.

When immersion techniques are used to impregnate the specimen with a solution of a 2-p-dioxanone in a suitable solvent, the specimen is simply placed in a container of solution so that all (or substantial portion) of the specimen is covered with the solution. The specimen can be stored in the container permanently (for example, glass containers may be used for exhibition purposes) or until the specimen is required for further study or analysis. Concentrations of active 2-p-dioxanone compound in the treating solution of from about 1 percent to 100 percent by weight are suitable. It is usually more economical to use solutions wherein the concentration of active δ-lactone ingredient is no more than 80 percent by weight, and preferably from about 10 percent to 80 percent.

These same solutions may be utilized when either injection or infusion techniques are used to impregnate the specimens of animal tissue. When injection techniques are used, the embalming fluid (whether as a pure compound or as a solution) is introduced into the specimen by pressure, for example, with a hypodermic needle and syringe. When infusion methods are used, the embalming fluid is introduced into the circulatory system of the specimen to be preserved and the preserving fluid is allowed to diffuse into the rest of the tissue.

In general, amounts of 2-p-dioxanone compounds (calculated on the basis of the δ-lactone form rather than as the acid form) of from 5 percent to 50 percent by weight of the average treated specimen are sufficient to give a storage life for the treated specimen of from one month to an indefinite period. Impregnation of a specimen with amounts of 2-p-dioxanone compounds as low as 10 percent by weight of the treated specimen will give substantially permanent preservation. The amount of embalming material deposited in the specimen may be varied to suit the purpose for which the specimen is to be used. Exhibition specimens should be treated with large amounts of the 2-p-dioxanone compounds, while specimens which will be further dissected within a few days or weeks will require less embalming fluid because the treatment is not to be permanent.

One advantage of embalming fluids which contain 2-p-dioxanone or methyl- and ethyl-substituted 2-p-dioxanone (and/or the hydrolysis products of such dioxanone compounds) as the active preservative ingredients over other commonly used preservatives is that the embalming fluids of this invention do not constrict the blood vessels during the infusion process. Moreover, the nerve tissues are not obliterated and can be readily observed after treatment of the specimen. The δ-lactone preservatives as well as their hydrolysis products (especially 2-p-dioxanone and 2-hydroxyethoxyacetic acid) are compatible with polymeric compositions (such as the synthetic latexes) so that a colored polymer which also contains preservative can be introduced into the veins and arteries of the specimen in a single step (rather than introducing a colored polymer into the blood vessels after the specimen has been treated with a preservative).

The following examples are submitted for the purpose of illustration only and are not to be construed as limiting the scope of the invention in any way.

*Example I*

Specimens of liver were taken from a freshly-killed rabbit and placed in solutions of 5, 10, 25, 50 and 100 percent by weight of 2-p-dioxanone in water. These liver specimens did not demonstrate any evidence of putrefaction and remained soft and pliable after 60 days of storage. When preserved with formaldehyde solutions, liver tissue loses its resilience after about two days of storage.

*Example II*

Mice were sacrified and opened by a neutral mid-line incision. They were immersed in solutions of 60, 80 and 100 percent by weight of 2-p-dioxanone in water and in solutions of 1, 5, 10, 20, 40, 60 and 80 percent by weight of 2-p-dioxanone in a 4 percent neutral buffered formaldehyde solution. All animals were preserved and those treated with solutions of 60 and 80 percent by weight of 2-p-dioxanone in formalin were softer and more pliable than those specimens preserved with standard formalin solutions containing about 5–10 percent formalin and no 2-p-dioxanone.

*Example III*

The hind legs of sacrificed dogs were infused with solutions of 80 percent and 60 percent by weight of 2-p-dioxanone in water. The limbs were stored in a 33 percent solution of dioxanone in water. They remained soft, pliable and preserved. No evidence of deterioration or loss of flexiblility was noted after storage for a period of 10 months.

*Example IV*

A dog heart was infused with a 50 percent by weight solution of 2-p-dioxanone in an acrylate latex. The composition of the latex prior to the addition of an amount of 2-p-dioxanone sufficient to form a 50 percent by weight solution was 46 percent by weight of solids suspended in H₂O. The suspended solids composition was a copolymer of 2 parts by weight of ethyl acrylate per part of methyl acrylate. The heart was stored in a 60 percent by weight solution of 2-p-dioxanone in water. The heart remained preserved, soft, pliable and retained the natural color of heart muscle for a period of 10 months without showing any signs of deterioration.

I claim as my invention:

1. A process for the preservation of specimens of the animal kingdom which comprises contacting said specimens with a compounds of the formula

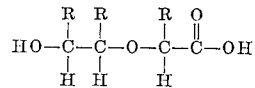

wherein each R is independently selected from the group consisting of the hydrogen atom and an alkyl group of from 1 to 2 carbon atoms.

2. The process of claim 1 wherein the preservative compound is injected into the specimen.

3. The process of claim 1 wherein the preservative compound is infused into the specimen.

4. The process of claim 1 wherein the specimen is immersed in a fluid containing the preservative compound.

5. A method for the preservation of specimens of the animal kingdom which comprises contacting said specimen with an aqueous solution of 2-hydroxyethoxyacetic acid.

6. The process of claim 5 wherein the concentration of 2-hydroxyethoxyacetic acid in the aqueous solution is at least one percent by weight.

7. A method for the preservation of specimens of the animal kingdom in lifelike form which comprises contacting said specimens with a compound of the formula

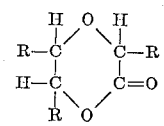

wherein each R is selected from the group consisting of the hydrogen atom, methyl and ethyl.

8. The process of claim 7 wherein the preserving compound is injected into the specimen.

9. The process of claim 7 wherein the preserving compound is infused into the specimen.

10. The process of claim 7 wherein the specimen is immersed in a fluid containing the preserving compound.

11. A method for preserving specimens from the animal kingdom in lifelike form which comprises contacting said specimen with an amount of 2-p-dioxanone sufficient to inhibit deterioration of the specimen.

12. The method of claim 11 wherein 2-p-dioxanone is injected into the specimen.

13. The method of claim 11 wherein 2-p-dioxanone is infused into the specimen.

14. The method of claim 11 wherein the specimen is immersed in a fluid containing 2-p-dioxanone.

15. A method for preserving mammalian tissues in lifelike form which comprises contacting said tissues with a fluid containing from 1 percent to 100 percent by weight of 2-p-dioxanone.

16. A preserved specimen of animal tissue which contains an amount of 2-p-dioxanone sufficient to inhibit biological deterioration of the tissue.

References Cited by the Examiner

UNITED STATES PATENTS 3,063,968  11/1962  Schultz _____ 260—78.3

OTHER REFERENCES

Frederick et al.: The Principles and Practice of Embalming, published by Lawrence G. Frederick, Dallas, Texas, 1959, pages 197–199.

LEWIS GOTTS, *Primary Examiner.*

JULIAN LEVITT, *Examiner.*

RICHARD L. HUFF, *Assistant Examiner.*